United States Patent [19]

Popovic' et al.

[11] Patent Number: 5,645,781
[45] Date of Patent: Jul. 8, 1997

[54] PROCESS FOR PREPARING TEXTURED CERAMIC COMPOSITES

[75] Inventors: Dragan Popovic', Tucson, Ariz.; John W. Halloran, Ann Arbor, Mich.; Gregory E. Hilmas, Saline, Mich.; Guy Allen Brady, Ann Arbor, Mich.; Scott Somers, East Lansing, Mich.; Andrew Barda, Battle Creek, Mich.; Gregory Zywicki, Warren, Mich.

[73] Assignee: The Regents of the University of Michigan, Ann Arbor, Mich.

[21] Appl. No.: 309,853

[22] Filed: Sep. 21, 1994

[51] Int. Cl.⁶ .................. B29C 47/06; B29C 63/00; B28B 5/00
[52] U.S. Cl. .................. 264/639; 264/172.15; 264/250
[58] Field of Search .................. 264/60, 115, 172.15, 264/250

[56] References Cited

U.S. PATENT DOCUMENTS

| | | | |
|---|---|---|---|
| 2,699,415 | 1/1955 | Nachtman | 154/91 |
| 3,098,723 | 7/1963 | Micks | 29/183.5 |
| 3,793,041 | 2/1974 | Sowman | 106/67 |
| 3,795,524 | 3/1974 | Sowman | 106/65 |
| 3,811,920 | 5/1974 | Galasso | 117/69 |
| 3,953,636 | 4/1976 | Kirchner | 428/155 |
| 3,996,145 | 12/1976 | Hepburn | 252/62 |
| 4,521,360 | 6/1985 | Fiorentino | 264/108 |
| 4,605,594 | 8/1986 | Owens et al. | 428/373 |
| 4,640,848 | 2/1987 | Cerdan-Diaz et al. | 427/426 |
| 4,642,271 | 2/1987 | Rice | 428/698 |
| 4,772,524 | 9/1988 | Coblenz | 428/699 |
| 4,908,340 | 3/1990 | Frechette et al. | 501/95 |
| 4,990,490 | 2/1991 | Pathare et al. | 505/1 |
| 5,041,248 | 8/1991 | Renlund et al. | 264/44 |
| 5,053,092 | 10/1991 | Lachman | 156/89 |

FOREIGN PATENT DOCUMENTS 1397955   6/1975   United Kingdom.

*Primary Examiner*—Christopher A. Fiorilla
*Attorney, Agent, or Firm*—Leydig, Voit & Mayer, Ltd.

[57] ABSTRACT

A method for the preparation of a fibrous monolithic ceramic which exhibits non-brittle fracture characteristics from green monofilament ceramic fibers having a controlled texture. This method includes the steps of: (a) forming a first ceramic-laden composition includes a thermoplastic polymer and at least about 40 vol. % of a ceramic particulate into a substantially cylindrical core, (b) applying a layer of a second ceramic-laden composition includes a thermoplastic polymer and at least about 40 vol. % of a ceramic particulate which differs from the particulate contained in the first composition onto the core to form a substantially cylindrical feed rod having an average initial diameter, (c) extruding the feed rod to form a green ceramic monofilament fiber which has an average diameter that is less than the average diameter of the feed rod, and (e) arranging the green ceramic monofilament fibers into a desired configuration to provide a green fibrous monolith, wherein, during the extrusion step, each ceramic-laden composition has a viscosity which is approximately equivalent to that of each other ceramic-laden composition, and, if the ceramics present in the extruded ceramic monofilament fiber are sintered, a plane of weakness defined by the interface of the core and the layer is provided, the interface being relatively weaker than the core. The green fibrous monolith may be sintered to provide a fibrous monolith.

14 Claims, 12 Drawing Sheets

PROCESS FOR PREPARING TEXTURED CERAMIC COMPOSITES

This patent was made with U.S. Government support under grant numbers N00014-93-1-0953 and N00014-93-1-0302 awarded by the Office of Naval Research. The Government has certain rights in the invention described herein.

TECHNICAL FIELD OF THE INVENTION

The present invention relates to methods for preparing textured ceramic composites, such as fibrous ceramic monoliths, using ceramic green fibers as well as to methods for the preparation of such ceramic green fibers having specific textures.

BACKGROUND OF THE PRESENT INVENTION

Attractive properties can be obtained from ceramic composites having a texture in which the distribution of two or more materials are well controlled. An example of such textured ceramic composites are fibrous monolithic ceramics. Unlike ordinary ceramics which abruptly and catastrophically suffer tensile fracture, fibrous monoliths have the unique property of non-brittle fracture—they gracefully split and delaminate, like, e.g., wood, thereby providing for non-catastrophic failure. This property is of great value in many applications, e.g., high temperature structural applications such as those encountered by engine components as well as a number of other automotive structural applications.

A more detailed description of the structure and properties of such fibrous monolithic ceramics is provided in U.S. Pat. No. 4,772,524. This patent discloses a fibrous monolithic ceramic body as comprising a plurality of compacted, coated, and sintered fibers. These fibers comprise a core of a first ceramic composition, and a coating on that core of a different ceramic composition. This coating is referred to as a "debond phase," and serves as a "plane of weakness." The particular debond phase described in the '524 patent is said to be comprised of three ceramics—aluminum titanate, zirconia, and halfnia—all of which possess a tendency to spontaneously microcrack. By providing a layer of these microcracked ceramics, it was found that the desired "plane of weakness" was formed in the fiber.

It is this plane of weakness which provides a fibrous monolith prepared using such a fiber, after sintering, with a non-brittle fracture characteristic. Specifically, the interface, which defines a plane of weakness, will function to deflect a crack in the coating, or "debond phase, from normal to the plane of weakness to a direction parallel to the plane of weakness. Thus, catastrophic failure of the fibrous monolith prepared using such fibers is avoided.

The '524 patent further discloses a process for preparing such fibrous monolithic ceramics. This process comprises coating a fugitive cotton thread by passing that thread first through a suspension of the core composition, and subsequently through the coating composition, to provide a ceramic fiber. These fibers are then arranged together to form the desired fibrous monolith.

Since the issuance of the '524 patent, new varieties of fibrous monolithic ceramics have been discovered. See, e.g., S. Baskaran et al., "SiC-Based Fibrous Monolithic Ceramics," *Ceramic Sci. & Eng. Proc.* 14 (9–10) pp. 813–823; S. Baskaran et al., "Fibrous Monolithic Ceramics, I: Fabrication, Microstructure, and Indentation Behavior," *J. Am. Cer. Soc'y* 76 (9), pp. 2209–16 (1993); S. Baskaran et al., "Fibrous Monolithic Ceramics, II: Flexural Strength and Fracture Behavior of the SiC/Graphite System," *J. Am. Cer. Soc'y* 76 (9) pp. 2217–24 (1993); S. Baskaran et al., "Fibrous Monolithic Ceramics, III: Mechanical Properties and Oxidation Behavior of the SiC/BN System," *J. Am. Cer. Soc'y* 77 (5) pp. 1249–55 (1994); S. Baskaran et al., "Fibrous Monolithic Ceramics, IV: Mechanical Properties and Oxidation Behavior of the Alumina/Ni System," *J. Am. Ceramic Soc'y,* 77, (5) pp. 1256–62 (1994); and D. Popovic' et al., "Silicon Nitride and Silicon Carbide Fibrous Monolithic Ceramics" 42 *Silicon Based Structural Ceramics* (B. W. Sheldon et al. eds., Am. Cer. Soc'y, Westerville, Ohio, 1994) pp. 173–86. In these newly discovered ceramic fibrous monoliths, the ceramic fibers from which they are prepared establish a plane of weakness therein by using a graphite layer or a boron nitride layer. The core composition, in contrast, was able to be prepared from a wide variety of ceramics including, e.g., silicon carbide, silicon nitride, and alumina.

In conjunction with or shortly after the discovery of the aforementioned new materials, new methods for preparing the ceramic fibers used to fabricate fibrous monoliths were also discovered. Specifically, it was taught that the core of a green ceramic fiber could be prepared either by dry spinning or melt spinning a composition comprising a polymer and ceramic powder. To complete the ceramic fiber, it was further taught that the coating layer was to be subsequently applied by dipping the core into a slurry of the debond phase composition.

Three U.S. patents have issued which involve the extrusion of a mixture of a ceramic powder and a polymer to form a fiber. The first patent, U.S. Pat. No. 4,908,340, discloses the extrusion of ceramic green fibers by melt spinning a mixture of thermoplastic polymers and ceramic powders. The second, U.S. Pat. No. 4,990,490, describes a process for the thermoplastic extrusion of green fibers from superconducting ceramics which are subsequently coated with metal powders. The third patent, U.S. Pat. No. 5,041,248 describes the extrusion of green fibers by melt spinning polyisobutylene with ceramic powders. This patent further discloses that its thermoplastic extrusion process may be used to make sintered ceramic bars, rods, tubing, or fibers from ceramic-polymer mixtures. The mixtures are described as those in which the polymer acts as a fugitive vehicle, it being later removed during the heat treatment required to obtain a sintered ceramic product.

In summary, fibrous monoliths have traditionally been fabricated using fibers that were prepared by the laborious process of dip-coating previously extruded solid ceramic cores in a coating composition comprising ceramics and polymers. While this provides a textured fiber, it is slow, inconvenient to set-up and use, difficult to control, and is unable to provide a uniformly-textured fiber.

Thus, there exists a need for a more efficient method for preparing fibrous monolithic ceramics which exhibit non-brittle fracture characteristics using green ceramic fibers. The exists a further need for a method by which the texture of fibers used to prepare such monoliths can be more readily controlled.

It is therefore an object of the present invention to provide a relatively efficient method for preparing fibrous monolithic ceramics which exhibit non-brittle fracture characteristics from green ceramic fibers.

Another object of the present invention is to provide a relatively efficient method for preparing such green ceramic fibers despite the presence of high levels of ceramic particulate loading in any composition from which the fibers are prepared.

A further object of the present invention is to provide a green ceramic fiber useful for preparing fibrous monolithic ceramics in which the texture of the fiber is precisely controllable within defined parameters.

Yet another object of the present invention to provide a method for increasing the strength of fibrous monolithic ceramics.

These and other objects and advantages of the present invention, as well as additional inventive features, will be apparent from the description of the invention provided herein.

BRIEF SUMMARY OF THE INVENTION

In one aspect, the present invention provides a method for the preparation of a fibrous monolithic ceramic which exhibits non-brittle fracture characteristics from green monofilament ceramic fibers having a controlled texture. This method comprises: (a) forming a first ceramic-laden composition comprising a thermoplastic polymer and at least about 40 vol. % of a ceramic particulate into a substantially cylindrical core, (b) applying a layer of a second ceramic-laden composition comprising a thermoplastic polymer and at least about 40 vol. % of a ceramic particulate which differs from the particulate contained in the first composition onto the core to form a substantially cylindrical feed rod having an average initial diameter, (c) extruding the feed rod to form a green ceramic monofilament fiber which has an average diameter that is less than the average diameter of the feed rod, and (e) arranging the green ceramic monofilament fibers into a desired configuration to provide a green fibrous monolith, wherein, during the extrusion step, each ceramic-laden composition has a rheology which is approximately equivalent to that of each other ceramic-laden composition, and, if the ceramics present in the extruded ceramic monofilament fiber are sintered, a plane of weakness defined by the interface of the core and the layer is provided, the interface being relatively weaker than the core. Of course, the green fibrous monolith may be sintered to provide a fibrous monolith.

Another aspect of the present invention provides a method for the preparation of a fibrous monolithic ceramic which also exhibits non-brittle fracture characteristics. This method is the same as that described in the preceding paragraph, but further comprises extruding at least two of the green monofilament ceramic fibers substantially simultaneously to form a multifilament green ceramic fiber, and then using those multifilament fibers to prepare a green fibrous monolith. It is believed that the use of such multifilament fibers will cause the fibrous monolith to possess a greater strength as compared to a fibrous monolith prepared using monofilament fibers.

Further aspects of the present invention provide methods for the preparation of the mono- and multi-filament fibers used in preparing the fibrous monolithic ceramics in which the texture of the fibers may be readily controlled.

The invention may best be understood with reference to the accompanying drawings wherein illustrative embodiments are shown and in the following detailed description of the preferred embodiments.

DESCRIPTION OF THE PREFERRED EMBODIMENTS

Figure 1:
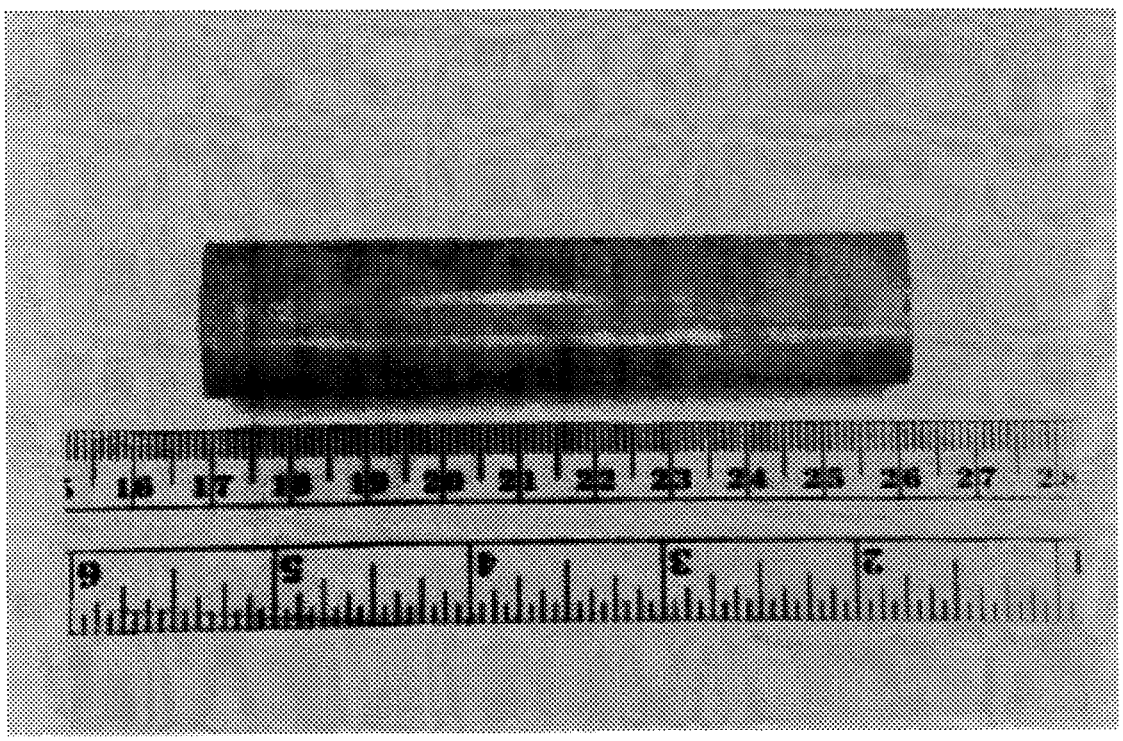
FIG. 1 is a photograph of a molded core for a feed rod prepared in accordance with a method of the present invention.

One aspect of the present invention provides a method for preparing fibrous monolithic ceramics having non-brittle fracture characteristics using a textured ceramic fiber which has been prepared by the simultaneous extrusion of a particular ceramic feed rod. The feed rod comprises a core prepared from a first ceramic composition and a shell which surrounds that core that is prepared from a second, and different, ceramic composition. Each of the compositions used to prepare the aforementioned fiber comprise a ceramic particulate component and a thermoplastic polymer component, the latter acting as a fugitive carrier for the ceramic particulates, i.e., the polymer is removed when the fiber, or a monolith prepared therefrom, is subjected to high temperatures, such as those required to sinter the ceramic particles present in the compositions.

Specifically, this aspect of the present invention comprises forming a first ceramic-laden composition comprising a thermoplastic polymer and at least about 40 vol. % of a ceramic particulate into a substantially cylindrical core. Subsequently, a layer of a second ceramic-laden composition comprising a thermoplastic polymer and at least about 40 vol. % of a ceramic particulate which differs from the ceramic particulate contained in the first composition is applied onto the core to form a substantially cylindrical feed rod.

Prior to the discovery of the present invention, it was appreciated by those skilled in the art that the introduction of such relatively high levels of ceramic particulates, e.g., above about 40 vol. %, into thermoplastic polymers would make the extrusion of such loaded polymers very difficult. One of the reasons for this is the dramatic changes that occur in the rheology of the molten polymer mixture. Specifically, such mixes were known to possess, at least, significant yield stress and a much higher viscosity as compared to the unfilled polymer. Until the discovery of the present invention, then, such problems were thought to foreclose the ability of one to successfully extrude more than one such composition simultaneously, i.e., using two continuous extruders to feed two such molten polymer compositions through a complex coextrusion die, and still obtain a usable green ceramic fiber therefrom. One of the aspects of the present invention is the recognition that a desired geometry in the fiber product may be obtained by extruding a "controlled geometry" feed rod, i.e., the desired fiber geometry is created in the feed rod itself. This method allows a fiber of a particular desired texture to be prepared by simple piston extrusion through a simple extrusion die.

In order to provide a fibrous monolith having non-brittle fracture characteristics, the components which comprise the compositions from which the feed rod is prepared should be selected so that, if one sinters the extruded ceramic fiber, a plane of weakness defined by the interface of the core and the layer is provided, wherein the interface is relatively weaker than the core. Although specific examples of materials which will provide a fiber having such attributes will be provided herein, the selection of such materials is well within the means of one skilled in the art due to the availability of published materials on the subject of fibrous monolithic ceramics.

In preparing the ceramic-laden compounds used in the inventive methods, the fine ceramic powder will typically be blended with a fiber-forming polymer and, advantageously, one or more processing aids. Most fiber-forming thermoplastic polymers can be used in the compositions of the present invention, but preferred polymer systems are the highly flexible polymers and copolymers, advantageously ethylene polymers and copolymers, and preferably polyethylene, ethylene-ethyl acetate copolymers ("EEA") (e.g., DPDA-618NT, Union Carbide) and ethylene-vinyl acetate copolymers ("EVA") (e.g., ELVAX 470, E. I. DuPont Co.).

A wide variety of powder ceramics may also be used in the ceramic-laden compositions, affording a wide flexibility in the composition of the ultimate textured ceramic composite. Advantageously, powders which may be used in the first ceramic-laden composition to provide the core of the feed rod include ceramic oxides, ceramic carbides, ceramic nitrides, ceramic borides, and silicides. Preferred powders for use in that composition include aluminum oxide, barium oxide, beryllium oxide, calcium oxide, cobalt oxide, chromium oxide, dysprosium oxide and other rare earth oxides, lanthanum oxide, magnesium oxide, manganese oxide, niobium oxide, nickel oxide, aluminum phosphate, lead oxide, lead titanate, lead zirconate, silicon oxide and silicates, thorium oxide, titanium oxide and titanates, uranium oxide, yttrium oxide, yttrium aluminate, zirconium oxide and its alloys, boron carbide, iron carbide, hafnium carbide, molybdenum carbide, silicon carbide, tantalum carbide, titanium carbide, uranium carbide, tungsten carbide, zirconium carbide, ceramic nitrides including aluminum nitride, cubic boron nitride, silicon nitride, titanium nitride, uranium nitride, yttrium nitride, zirconium nitride, aluminum boride, hafnium boride, molybdenum boride, titanium boride, zirconium boride, and molybdenum disilicide.

In regard to the powders suitable for use in the second composition, the composition which provides the debond layer, there are advantageously included: agents known, from the available literature, to create weak interfaces such as fluoromica, tin oxide and lanthanum phosphate; agents known, from the available literature, to create porosity in a layer which function to create a weak interface; graphite powders and graphite-containing powder mixtures; and hexagonal boron nitride powder and boron nitride-containing powder mixtures. If a metallic debond phase is desired, reducible oxides of metals may be used, e.g., nickel and iron oxides, or powders of metals, e.g., nickel, iron, cobalt, or their alloys.

In regard to ceramic powder size, ultrafine powders have been successfully used, e.g., HSY-3.0 zirconia (a specific surface area of 7.0 $m^2/g$ and an average particle size of 1 micrometer, available from Daichi Kigenso) and Cabot® Black Pearl 2000 carbon black (a specific surface area of 1500 $m^2/g$ and an average particle size of 12 nanometers, available from Cabot Corporation). However, relatively coarse powders, e.g., those having average diameters above about 5 μm and up to about 10 μm, may also be used successfully in the ceramic-laden compositions, e.g., an 80% nickel/20% chromium alloy powder.

The level of powder loading in each composition should range from at least about 40 vol. %, and may advantageously range from about 40 vol. % to about 70 vol. %. Preferably, the loading may comprise about 50 vol. %. These levels are selected in order to provide good sintering behavior of the powder. Additional amounts of processing aids, as described further in the following paragraph, may be added to improve the dispersion of the powder within the composition, particularly when the powder loading exceeds about 60 vol. %.

As mentioned in the previous paragraph, a processing aid is advantageously included in the compositions in order to reduce the viscosity of the polymer compositions, aid in the dispersion of the powder in the compositions, and act as a lubricant for the compositions during extrusion. Many different oils, waxes, stearates, and fatty acids may be used, with preferred processing aids including methoxypolyethylene glycol having a MW of about 550 (e.g., MPEG 550 or Carbowax® 550, Union Carbide) and mineral oil, such as heavy mineral oil (Mineral Oil White, Heavy, Labguard®) or light mineral oil ((Mineral Oil White, Light, Labguard®) because they do not significantly degrade weaken or embrittle the green ceramic fiber.

It was determined that the compounding or mixing of the powders with the polymer and processing aids may be accomplished according to procedures known in the art of plastics compounding, despite the fact that the filler loading is higher than that experienced in typical plastic compositions. As will be appreciated by those skilled in the art, however, different powder/polymer/processing aid combinations require slightly different compounding techniques for providing the proper dispersion of those components in the ceramic-laden composition.

After the feed rod has been prepared from the appropriate ceramic/polymer compositions, it is extruded through an extrusion die to provide the desired green ceramic fiber. When the feed rod is the same shape as the orifice, as for example when both are round (the feed rod being substantially cylindrical), and certain other conditions are met, the flow field of the extrudate is such that there is little or no axial distortion. Thus, the present invention provides a method by which feed rods with a certain axially symmetric pattern or texture on a coarse scale can be extruded to form a nearly identical version of that pattern, but on a smaller scale. One is able to obtain such small scale axial texture in a ceramic fiber by the coextrusion of an axially symmetric feed rod.

For example, consider the scenario wherein one desires to prepare a 300 μm diameter green fiber having a 250 μm diameter core of material A, with 50 μm thick cladding of material B. To produce this fiber, a 22 mm controlled geometry feed rod is prepared by molding material to provide a core rod (a solid cylinder) having a diameter of 18.3 mm, and combining this rod with a hollow cylindrical shell (e.g., provided by molding two half cylindrical shells that, when placed onto the core, will provide a complete cylindrical shell) that has been molded using material B. This hollow shell has a thickness of 3.7 mm, i.e., the shell has an inner diameter of 18.3 mm and an outer diameter of 22 mm. This feed rod is then suitably extruded through a 300 μm orifice at the appropriate temperature and pressure to provide the desired 300 μm green ceramic fiber.

In contrast to the axial symmetry, however, is the effect extrusion has upon the composition in the radial direction. Specifically, in the radial direction, the flow field present during extrusion causes distortions which result in the preparation of a non-axially symmetric fiber. For example, when one provides a feed rod having a sequence of layers of different compositions in the axial direction, such layers can be dramatically extended by the flow field to produce a pattern which is rather like tree rings. It has been recognized, however, that this effect can be used in a positive manner to create another distinct type of fine-scale texture in radially coextruded ceramic fibers.

Despite the foregoing, and as mentioned in a previous paragraph, preparing a ceramic fiber using a coextrusion method which possesses the same axial geometry as a two component feed rod is difficult. The extrusion will, if uncontrolled, cause distortion in the geometry of the feed rod as it passes through the extrusion die. In order to avoid such unwanted distortion, the rheology of the compositions being extruded should be substantially identical. Advantageously, and further, the temperature and rate at which the extrusion is conducted should also be selected so as to minimize the distortion in the geometry of the feed rod. One particular aspect of the rheology that should be controlled to retain this geometry is the viscosity of each composition. More specifically, each ceramic-laden composition should possess a viscosity which is approximately equivalent to that of each other ceramic-laden composition. Without such matching and careful control, flow instabilities between the two compounds will result, yielding a fiber which does not substantially replicate the original geometry of the feed rod.

As with any extrusion process, the reduction ratio is another important parameter. Although certain reduction ratios are provided in the Examples which follow, they should be considered to be merely illustrative, and not limiting. In the particular case of multifilament coextrusion, which will be discussed in a subsequent section, it should be recognized that a wide variety of spatial scales of the extrudate can be obtained by varying the reduction ratios of the first and second extrusion steps. It should further be noted that three or more extrusion steps could be completed in series to provide a fiber of a very fine diameter.

Moreover, while the Examples disclose the use of generally cylindrical feed rods, the claimed invention is not necessarily limited to that geometry. Other shapes could also be co-extruded in the manner of the present invention.

If desired, and after the feed rod has been extruded and a green ceramic fiber has been provided in the manner of the present invention, one may apply at least one further layer of a ceramic-laden composition comprising a thermoplastic polymer and at least about 40 vol. % of a ceramic particulate onto the fiber. When this scenario is undertaken, one essentially forms another feed rod, a second feed rod. This second feed rod may then be extruded to provide a green monofilament ceramic fiber having multiple layers of ceramic-laden compositions. This step may, if desired, be repeated any number of times. A second, and related, scenario provides for a further layer of ceramic-laden composition being layered onto an existing layer before the feed rod is extruded, i.e., the core material may be surrounded by one, two, or several layers of ceramic compositions. In either scenario, however, the ceramic particulate in each further layer should differ from that contained in the composition onto which the one further layer is applied.

After one ceramic fiber has been extruded, it may, if desired, be extruded with at least one other such fiber of the same or different composition and/or texture to provide a multifilament ceramic fiber. This may be achieved by molding a number of such fibers to form a new multifilament feed rod, and then extruding that newly formed feed rod. This process may be repeated any number of times to provide a multifilament fiber having very small, i.e., fine, filament diameters. Of course, the temperature and feed rate of the multifilament feed rod should be controlled to ensure that the geometry of the feed stock is not altered during extrusion. The multifilament green ceramic fibers provided by the foregoing process may be arranged to provide a green fibrous monolithic ceramic. It is believed that, because such fibers contain a great number of fine filaments, the monolith prepared from such fibers will possess greater strength that monoliths prepared using a monofilament fiber of an equivalent diameter.

After the coextruded product, either monofilament or multifilament, has been prepared, it can further be shaped by known means to produce green ceramic articles, such as green fibrous monoliths. Typically, the coextruded fiber or fibers will be molded by pressing in an appropriate mold at a temperature and pressure which will cause the fibers to form a solid, dense body from the individual mono- or multi-filament fibers. Any shape which can be compression molded or otherwise formed by plastic deformation can be obtained with the coextruded product. The molded article thus obtained is a ceramic "green body." The ceramic green body so molded has the desired texture created by the arrangement of the coextruded fibers. For example, a uniaxially aligned fibrous monolith can be obtained by the uniaxial lay-up of the coextruded fibers prior to molding, a random felt fibrous monolith can be obtained by molding randomly arraigned coextruded fiber, or a woven architecture can be obtained by molding a shape from previously woven coextruded green fiber. The coextruded product permits a wide variety of composite architectures to be fabricated in a molded green body.

Another important aspect of the coextruded product is that it serves as a ceramic green body, and hence can be treated to produce a ceramic article. This implies that the polymer and organic processing aids can be removed by one of the methods commonly employed in the field of ceramics, without damaging the molded article. One such example of polymer removal (or "binder burnout") is slow baking the green article to about 500° C., with a heating schedule determined by the characteristics of the polymer, the powder, and the geometry of the molded article, using techniques known in the art of molded ceramics and powder metallurgy. The ceramic body formed thereby may then be densified, by sintering or pressure sintering, to produce a high quality ceramic article, e.g., a fibrous monolith.

The conditions for sintering or pressure sintering are peculiar to the particular material. For a given material system, the densification conditions for textured ceramic composite made from coextruded product are similar to the conditions for the same material made with ordinary powder processing. Thus, such densification conditions can be readily determined by one skilled in the ceramic art.

The following examples further illustrate the present invention but, of course, should not be construed as in any way limiting its scope.

EXAMPLE 1

This example illustrates the preparation of a silicon nitride/boron nitride monofilament fiber in accordance with one aspect of the present invention.

1. Silicon nitride compound:
   A. Sinterable silicon nitride powder (E-10, UBE Chemical, Tokyo, Japan) mixed with sintering aids (9 wt % yttria powder and 3 wt % alumina powder): 37.23 g
   B. Ethylene Vinyl Acetate copolymer: 7.65 g
   C. Heavy Mineral oil: 3.21 g
2. Boron nitride compound:
   A. Boron nitride powder (HCP, Advanced Ceramic Corporation, Cleveland, Ohio): 24.75 g
   B. Ethylene Vinyl Acetate copolymer: 10.34 g
   C. Methoxypolyethylene Glycol (MW 550): 0.75 g The two ceramic compounds were prepared separately. The mixing was carried out in a Brabender Plastograph blender whose mixing bowl was preheated to about 120° C.–150° C. The ethylene copolymers and a portion of the processing aid were first added to the mixing bowl until they were melted and the torque reached a steady value. The dry powders were then added incrementally so that they blended thoroughly with the molten polymer. The balance of the processing aid was added incrementally with the powder. This compounding was continued until the apparent viscosity of the compound, as indicated by the torque rheometer function of the Brabender Plastograph, reached the desired level. For this example, the viscosity of the boron nitride compound was adjusted by the addition of processing aid in an amount such that its viscosity approximately matched the viscosity of the silicon nitride compound, i.e., about 18,000 poise at 170° C. The mixed compound was then removed from the blender and cooled.

A feed rod was molded from the silicon nitride compound using a 22 mm cylindrical mold. To accomplish this, granulated pieces of the compound were loaded into the mold and then molded at 150° C. and 23.2 MPa. After cooling, the molded feed rod was ejected. An example of a feed rod prepared by this process is illustrated in FIG. 1.

Figure 2:
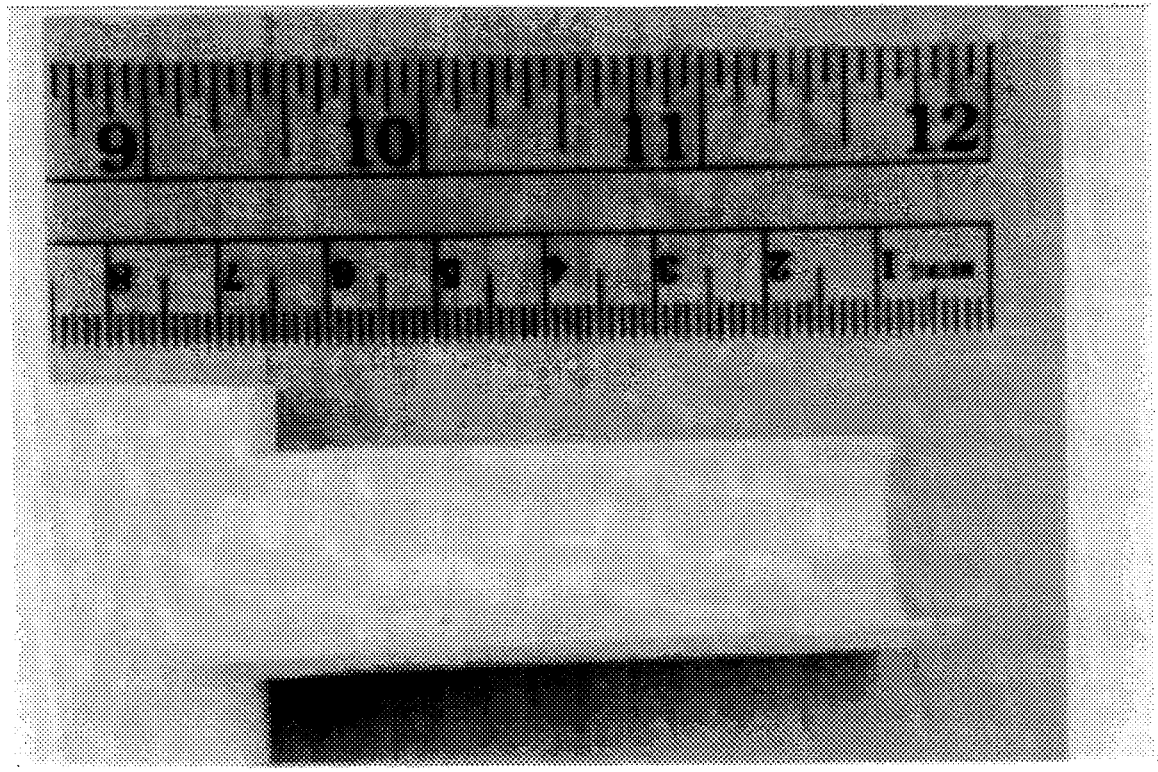
FIG. 2 is a photograph of one-half of a cylindrical shell which, with its other half, is used to clad the molded core depicted in FIG. 1.

Cylindrical shells of the boron nitride compound were compression molded using a mold to create a shell of the desired dimensions. To accomplish this, granulated pieces of the compound were loaded into the mold and subsequently molded at 150° C. and 8.9 MPa. After cooling, the shell segments were removed from the mold. An example of shells prepared by this process is illustrated in FIG. 2.

Figure 3:
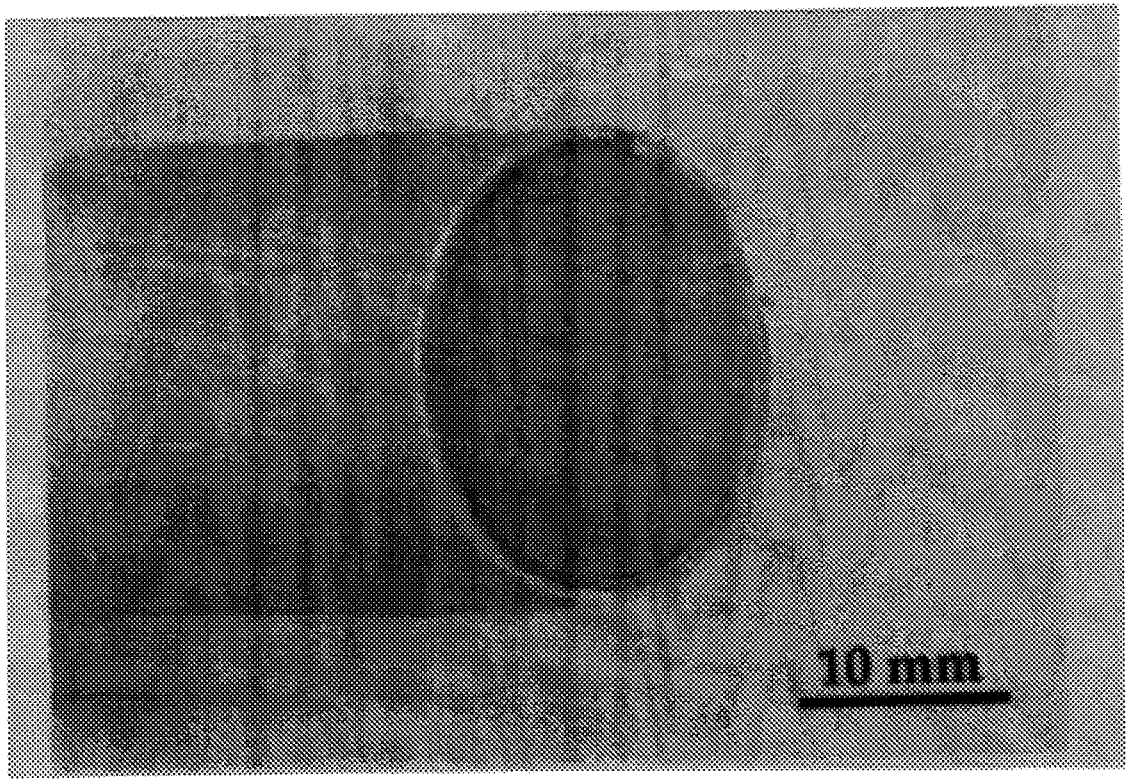
FIG. 3 is a photograph of the assembled feed rod which comprises the core depicted in FIG. 1 and two one-half cylindrical shells depicted in FIG. 2.

A controlled geometry feed rod was then assembled by combining the silicon nitride core rod with the two boron nitride half-cylindrical shells. An example of a feed rod prepared in this manner is illustrated in FIG. 3. This feed rod was then loaded into the extrusion cylinder of a Bradford laboratory fiber extrusion machine (Bradford University Research, Bradford, UK). The cylinder was fitted with an extrusion die having a 285 µm diameter. Extrusion was commenced, and conducted at about 165° C. A monofilament coextruded silicon nitride/boron nitride fiber was obtained.

Figure 4:
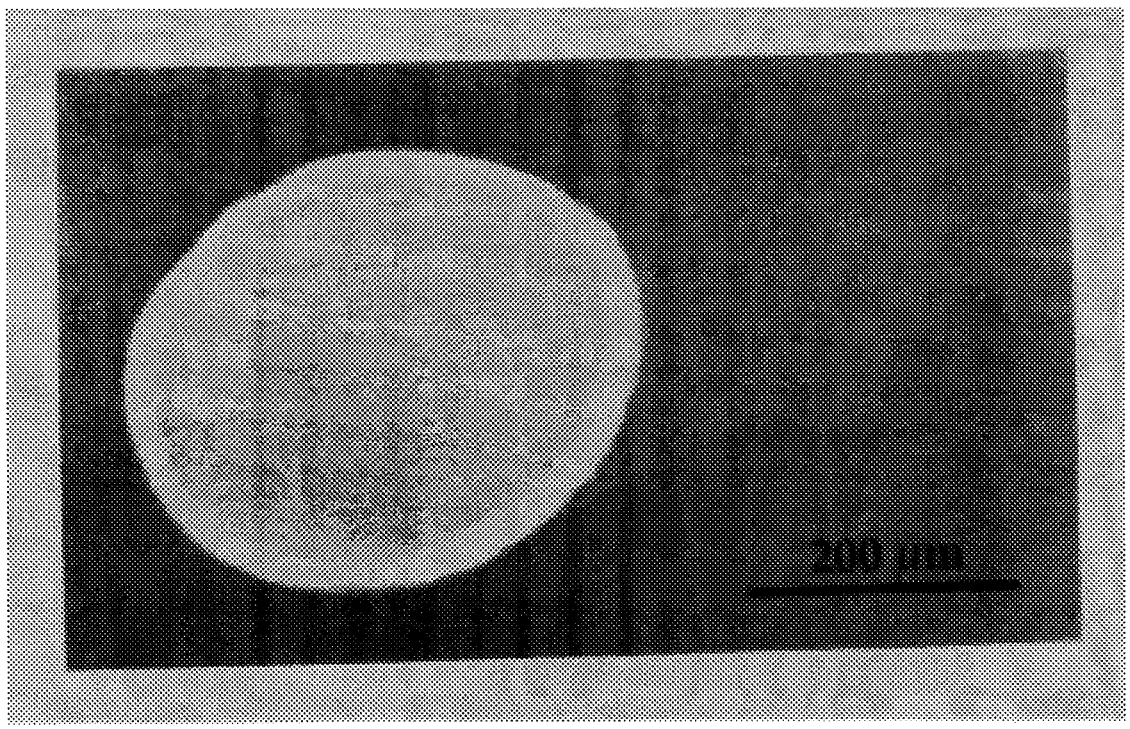
FIG. 4 is a photomicrograph of an axial cross-section of a monofilament green fiber prepared in accordance with a method of the present invention.
Figure 5:
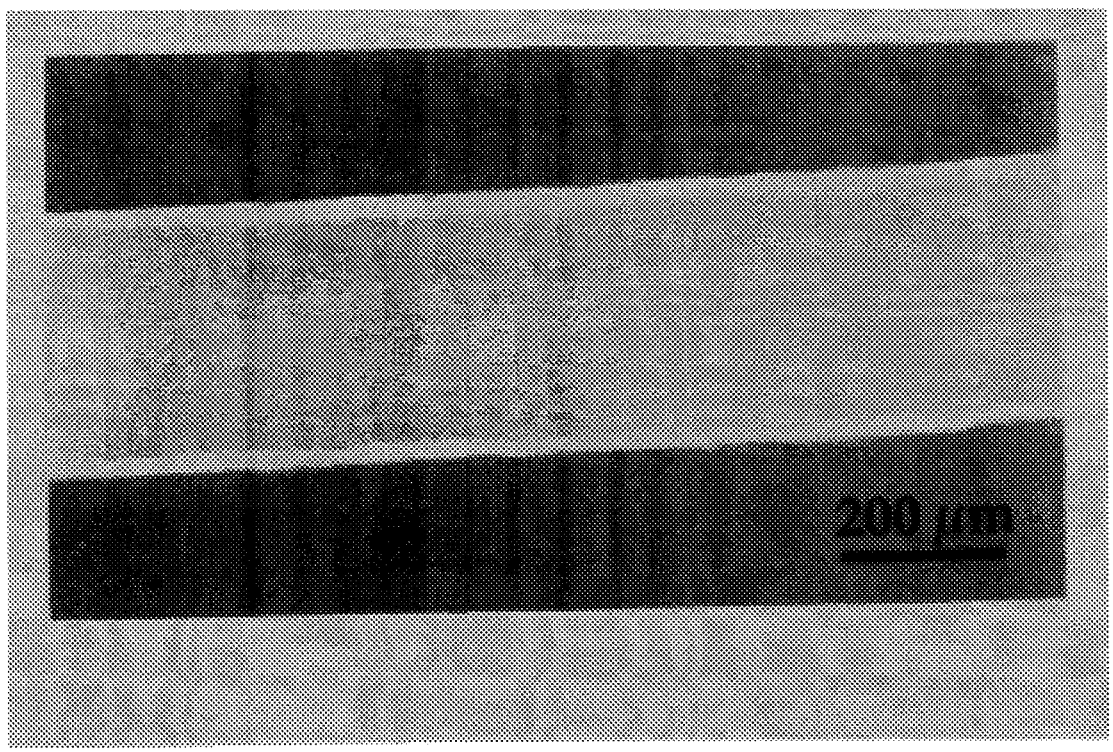
FIG. 5 is a photomicrograph of a longitudinal cross-section of a monofilament green fiber prepared by a method of the present invention.

The extrudate was collected continuously on a spooler. FIG. 4 illustrates a cross-section of a representative monofilament coextruded fiber prepared by the foregoing method, and FIG. 5 shows a longitudinal cross-section of that fiber.

After arranging the fibers in a desired architecture and molding them to a desired shape, the green fibrous monolithic ceramic prepared thereby was baked to remove the binder. The resulting fibrous monolith was pressure sintered at 1750° C.

EXAMPLE 2

This example illustrates the preparation of a silicon carbide/boron nitride monofilament fiber in accordance with one aspect of the present invention.

1. Silicon carbide compound:
   A. Sinterable silicon carbide powder (B-10, H. C. Starck, Newton, Mass.) mixed with sintering aids (11.1 wt % aluminum nitride powder and 8.9 wt % alumina powder): 39.41 g
   B. Ethylene Vinyl Acetate copolymer: 8.35 g
   C. Heavy Mineral Oil: 2.54 g
2. Boron nitride compound:
   A. Boron nitride powder (HCP): 27.0 g
   B. Ethylene Vinyl Acetate copolymer: 11.28 g
   C. Methoxypolyethylene glycol [MW 500]: 0.87 g The two ceramic compounds were prepared separately as in Example 1. For this example, both the silicon carbide compound and the boron nitride compound were adjusted to an apparent viscosity of about 13,000 poise at 170° C. The mixed compound was removed from the blender and cooled. As in Example 1, a feed rod was molded from the silicon carbide compound using a 22 mm cylindrical mold. Flat sheets of the boron nitride compound were compression molded by squeezing the granulated compound between flat steel sheets at a temperature of 80°–150° C. After cooling, the flat sheets were cut to the desired size and wrapped around the feedrod of the silicon carbide compound. The thickness of the sheets was adjusted to achieve the desired ratio of boron nitride to silicon carbide. A controlled geometry feedrod was then assembled from the boron nitride wrapped silicon carbide rod, and was extruded as in Example 1 to obtain monofilament coextruded silicon carbide/boron nitride fiber. The extrudate was collected continuously on a spooler.

After arranging the fibers in the desired architecture and molding them to the desired shape, the resulting green fibrous monolithic ceramic was baked to remove the binder and the fibrous monolith is pressure sintered to provide the finished fibrous monolith article.

EXAMPLE 3

This example illustrates the preparation of an aluminum oxide/80% nickel-20% chromium alloy monofilament fiber in accordance with one aspect of the present invention.

1. Aluminum oxide compound:
   A. Sinterable aluminum oxide powder (A16SG, ALCOA, Bauxite, Ark.): 44.55 g B. Ethylene Vinyl Acetate copolymer: 10.34 g
C. Heavy Mineral oil: 2.32 g
2. Nickel-Chromium compound:
A. Nickel-Chromium powder: 92.40 g
B. Ethylene Vinyl Acetate copolymer: 10.34 g
C. Methoxypolyethylene Glycol [MW 550]: 0.35 g The two ceramic compounds were prepared separately as in the preceding examples with a Brabender Plastograph at about 150° C. The aluminum oxide compound was adjusted to an apparent viscosity of 15,000 poise at 150° C., and the nickel-chromium compound to an apparent viscosity of about 13,000 poise at 150° C. A core rod was molded from the aluminum oxide compound in the manner set forth in the prior examples, and cylindrical shells of the nickel oxide compound were compression molded to create a shell of the desired dimensions. A controlled geometry feedrod was then assembled by combining the core rod with the two half-cylindrical shells. This feed rod was loaded into the extrusion cylinder of a Bradford laboratory fiber extrusion machine. The cylinder was fitted with an extrusion die having a 285 micrometer diameter. A monofilament coextruded aluminum oxide/nickel oxide fiber was obtained by extruding the feed rod at about 150° C. The extrudate was collected continuously on a spooler.

After arranging the fibers into a desired configuration and molding them to obtain the desired green fibrous monolithic ceramic, the monolith was baked to remove the binder and then pressure sintered at temperature of about 1350° C. to provide a fibrous monolith.

EXAMPLE 4

Figure 6:
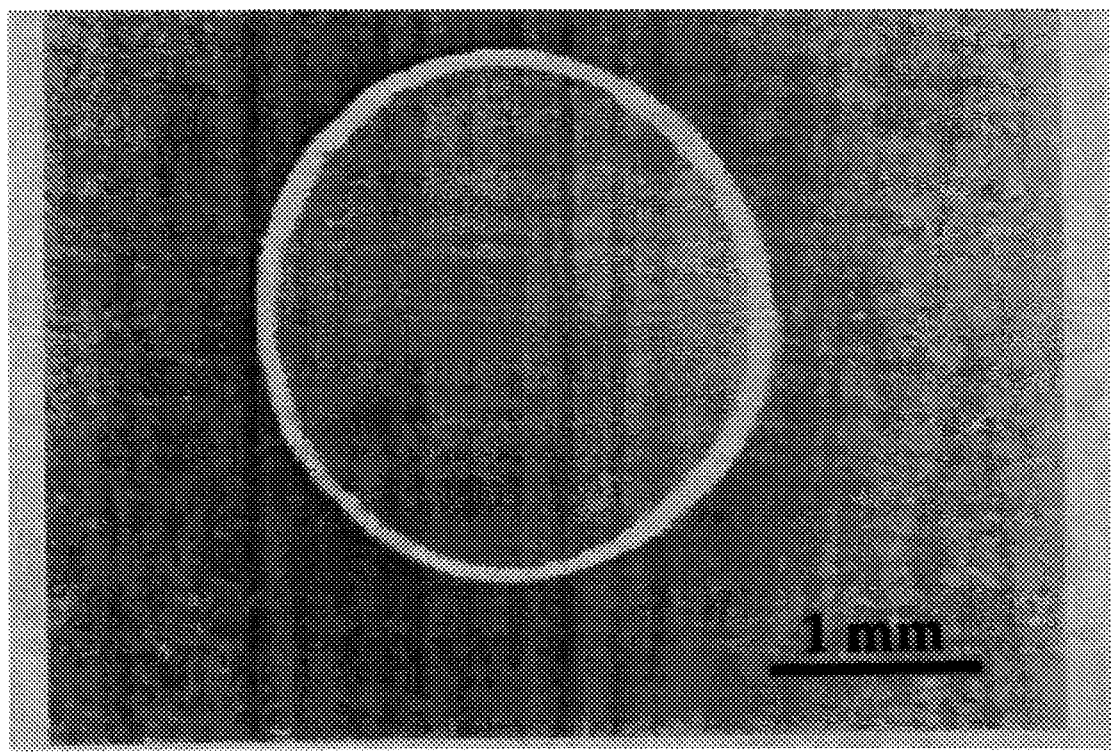
FIG. 6 is a photomicrograph of an axial cross-section of a monofilament green fiber prepared by a method of the present invention which will serve as one filament for the preparation of a multifilament green fiber.

This example illustrates the preparation of a silicon carbide/boron nitride multifilament fiber in accordance with one aspect of the present invention.
1. Silicon carbide compound:
A. Sinterable silicon carbide powder mixed with sintering aids (11.1 wt % aluminum nitride powder and 8.9 wt % alumina powder): 36.13 g
B. Ethylene Vinyl Acetate copolymer: 7.57 g
C. Polyethylene Glycol [MW 550]: 0.75 g
2. Boron nitride compound:
A. Boron nitride powder: 24.75 g
B. Ethylene Vinyl Acetate copolymer: 10.23 g
C. Methoxypolyethylene Glycol [MW 550]: 0.75 g The components of each compound were mixed in the manner set forth in Example 2. The apparent viscosity of both the silicon carbide compound and the boron nitride compound were then adjusted to an apparent viscosity of about 14,500 poise at 150° C. A controlled geometry feedrod was then prepared according to the method of Example 1, and 2.3 mm diameter monofilament fibers were provided by extrusion of the feed rods. An example of those extruded fibers is set forth in FIG. 6.

Figure 7:
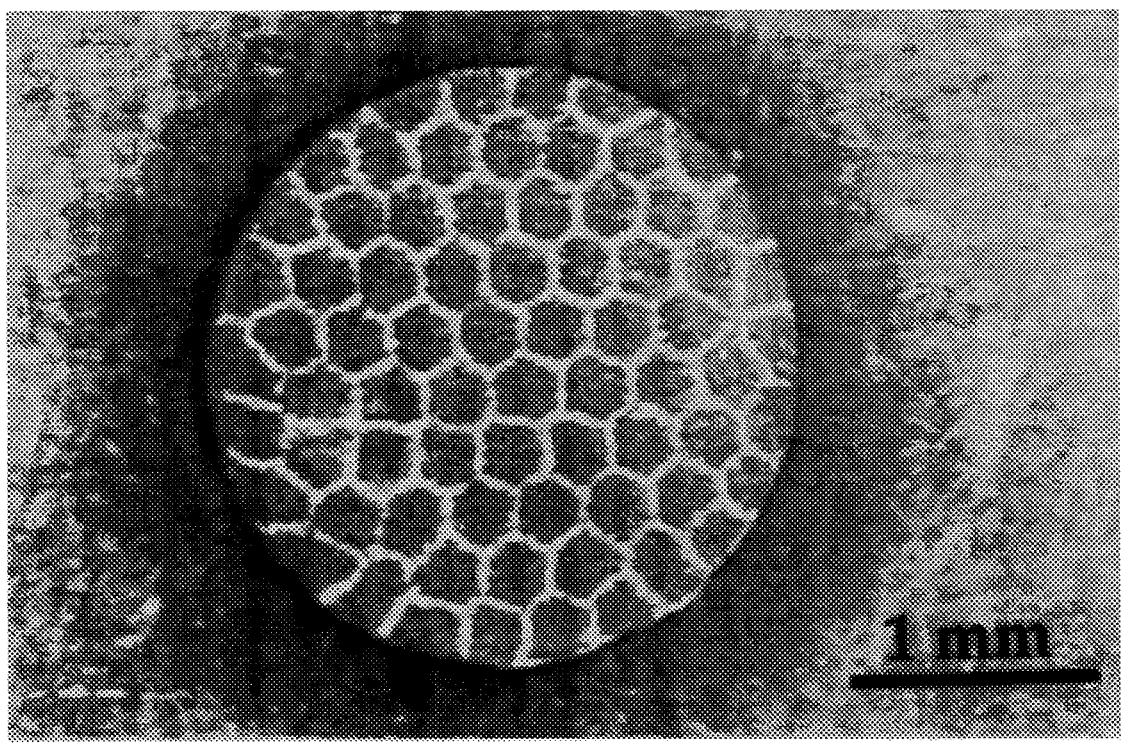
FIG. 7 is a photomicrograph of an axial cross-section of a multifilament green fiber prepared by a method of the present invention.

The 2.3 mm monofilament extruded fibers were then cut to a length appropriate for a feed rod and bundled together. About 65–70 of the 2.3 mm fibers were tightly packed together into a molding cylinder, wherein they were molded at 150° C. to form a multifilament feedrod. This multifilament feedrod was subsequently extruded at 110° C. through a 2.3 mm orifice to produce multifilament rod, as illustrated in FIG. 7.

Figure 8:
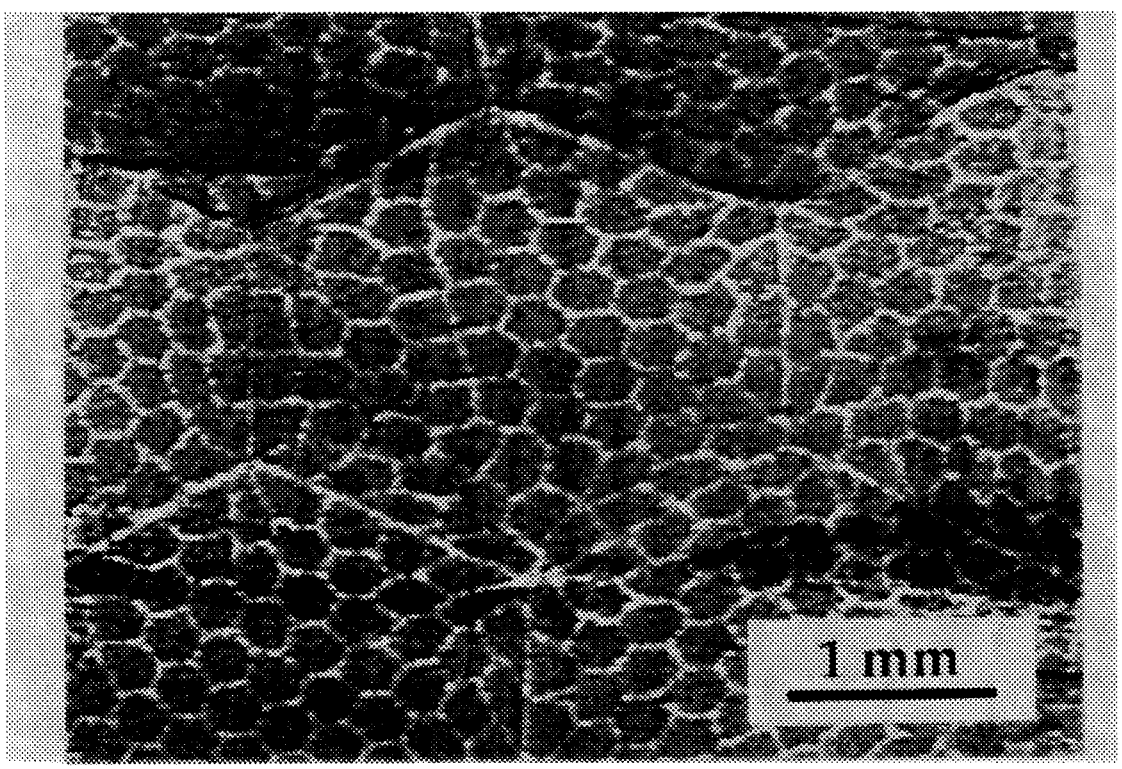
FIG. 8 is a photomicrograph of an axial cross-section of a textured green ceramic fibrous monolith prepared using a multifilament green fiber prepared in accordance with a method of the claimed invention.

After repeating the foregoing steps so that a number of multifilament fibers are prepared, a number of such fibers are arranged into a desired shape and molded to provide a green fibrous monolithic ceramic. An example of this ceramic is set forth in FIG. 8. The green ceramic monolith was then baked to remove the binder, and the resulting article pressure sintered to provide a fibrous monolith.

EXAMPLE 5

This example illustrates the preparation of a silicon nitride/boron nitride multifilament fiber in accordance with one aspect of the present invention.
1. Silicon nitride compound:
A. Sinterable silicon nitride powder mixed with sintering aids (9 wt % yttria powder and 3 wt % alumina powder): 37.23 g
B. Ethylene Vinyl Acetate copolymer: 7.65 g
C. Heavy Mineral oil: 2.16 g
D. Methoxypolyethylene Glycol [MW 550]: 1.0 g
2. Boron nitride compound:
A. Boron nitride powder: 24.75 g
B. Ethylene Vinyl Acetate copolymer: 10.34
C. Methoxypolyethylene Glycol [MW 550]: 0.75 g The components of each composition were compounding in the manner set forth in Example 1. The apparent viscosity of both the silicon nitride compound and the boron nitride compound were then adjusted to an apparent viscosity of about 18,000 poise at 170° C. A controlled geometry feedrod was then prepared by the method of Example 1, and 3 mm monofilament fibers were prepared by extrusion of the feed rod. About 30–50 of these 3 mm monofilament fibers were then cut to an appropriate length for a feed rod, and bundled together and molded, in the manner of Example 4, to form a multifilament feedrod. The multifilament feedrod was subsequently extruded at 110° C. through a 3 mm orifice to produce multifilament fiber. After preparing a number of such multifilament fibers and arranging them into a desired configuration, the configured fibers were molded to provide a green fibrous monolithic ceramic. This monolith was then baked to remove the binder, and the resulting article pressure sintered to provide a fibrous monolith.

EXAMPLE 6

This example illustrates the preparation of an alumina/graphite multifilament fiber in accordance with one aspect of the present invention.
1. Alumina compound:
A. Sinterable alumina powder: 44.55 g
B. Ethylene Vinyl Acetate copolymer: 10.23 g
C. Polyethylene Glycol [MW 550]: 0.5 g
2. Graphite compound:
A. Graphite powder: 24.75 g
B. Ethylene Vinyl Acetate copolymer: 11.26 g
C. Polyethylene Glycol [MW 550]: 0.5 g Each of the compounds were compounded in the manner set forth in Example 1. The apparent viscosity of both the alumina compound and the graphite compound were adjusted to an apparent viscosity of about 19,000 poise at 170° C. A controlled geometry feedrod was then prepared in accordance with the method of Example 4, and 2.3 mm diameter monofilament fibers were then prepared by extruding the feedrod. These 3 mm monofilament coextruded fibers were then cut to a length appropriate for a feedrod, and bundled together and molded as in Example 4 to provide a feed rod. This multifilament feed rod was subsequently extruded through a 2.3 mm orifice to produce a multifilament ceramic fiber.

After preparing a number of such fibers, arranging the fibers into a desired shape, and molding the shaped article, a green fibrous monolithic ceramic was obtained. This monolith was then baked to remove the binder, and subsequently sintered to provide a fibrous monolith.

EXAMPLE 7

This example illustrates the preparation of a zirconia oxide/aluminum oxide/nickel oxide multifilament fiber in accordance with one aspect of the present invention. This example will further illustrate the preparation of a zirconia/ nickel fibrous monolith, wherein an alumina interphase exists between the zirconia and the nickel.

1. Zirconia oxide compound:
   A. Sinterable zirconia—3 mole percent yttria powder: 66.99 g
   B. Ethylene Vinyl Acetate copolymer: 10.34 g
   C. Methoxypolyethylene Glycol [MW 550]: 1.38 g
2. Aluminum oxide compound:
   A. Sinterable aluminum oxide powder: 44.55 g
   B. Ethylene Vinyl Acetate copolymer: 10.34 g
   C. Methoxypolyethylene Glycol [MW 550]: 1.0 g
3. Nickel oxide compound:
   A. Nickel oxide alloy powder: 73.37 g
   B. Ethylene Vinyl Acetate copolymer: 10.34 g
   C. Methoxypolyethylene Glycol [MW 550]: 1.38 g Each of the compounds were compounding in the manner set forth in prior Examples. The apparent viscosity of both the zirconia compound and the nickel oxide compound were adjusted so that they were similar. The aluminum oxide compound was prepared according to the method set forth in Example 6. A feedrod was then molded from the zirconia in the manner as described in previous examples. Flat sheets of the alumina compound and the nickel oxide compound were compression molded in accordance with the method of Example 2. The thickness of the sheets were controlled to achieve the desired ratio of nickel to zirconia and alumina to zirconia in the feed rod. The alumina sheet was then wrapped around the zirconia rod, and the nickel oxide sheet was wrapped around the alumina sheet to fabricate the controlled geometry feedrod. The three-component feedrod was then extruded to provide a 2.3 mm monofilament fiber. As in Example 4, a number of these fibers were then bundled to create a multifilament feed rod, which feed rod was then extruded as before to form multifilament fiber.

Figure 9:
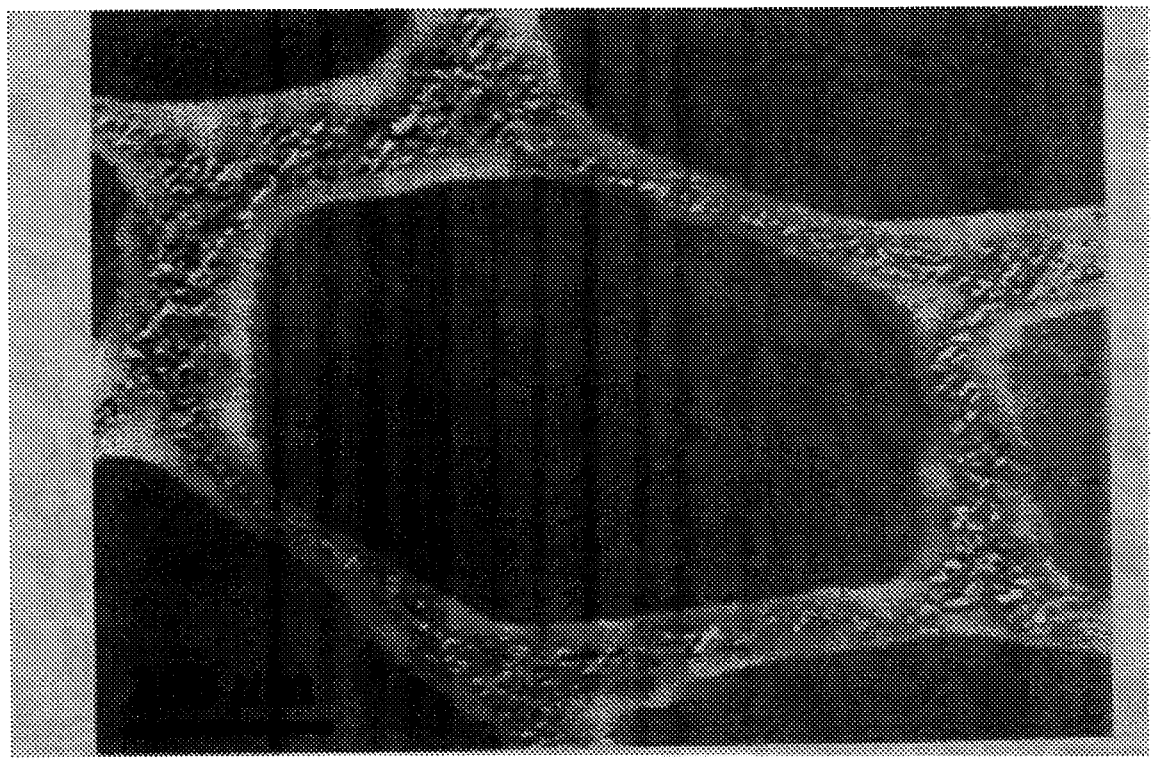
FIG. 9 is a photomicrograph of an axial cross-section of a pressure sintered ceramic/metal monolith having zirconium oxide cells and metallic nickel cell boundaries which are separated by an aluminum oxide interphase, which monolith was prepared using a multifilament green fiber.

After preparing a number of such multifilament fibers, arranging the fibers into a desired shape, and molding the shaped article, a green fibrous monolithic ceramic was obtained. This monolith was then baked to remove the binder, the nickel oxide was reduced to metallic nickel, and subsequently sintered to provide a fibrous monolith. The three-layer textured zirconium oxide/aluminum oxide/nickel green fiber is illustrated in FIG. 9.

EXAMPLE 8

This example illustrates the preparation of a "tree ring" texture in aluminum oxide/iron oxide fibers, using axial coextrusion, in accordance with one aspect of the present invention.

Figure 10:
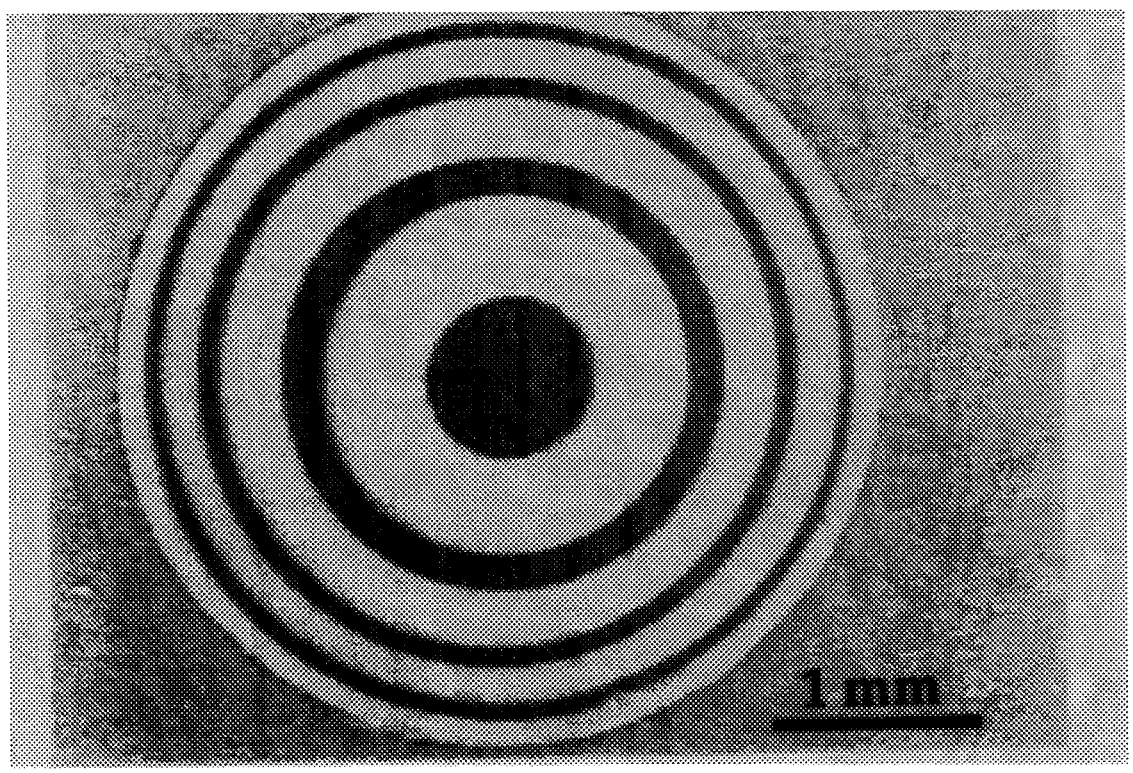
FIG. 10 is a photomicrograph of an axial cross-section of a filament which was axially extruded in a manner of the present invention which demonstrates its "tree ring" structure.
Figure 11:
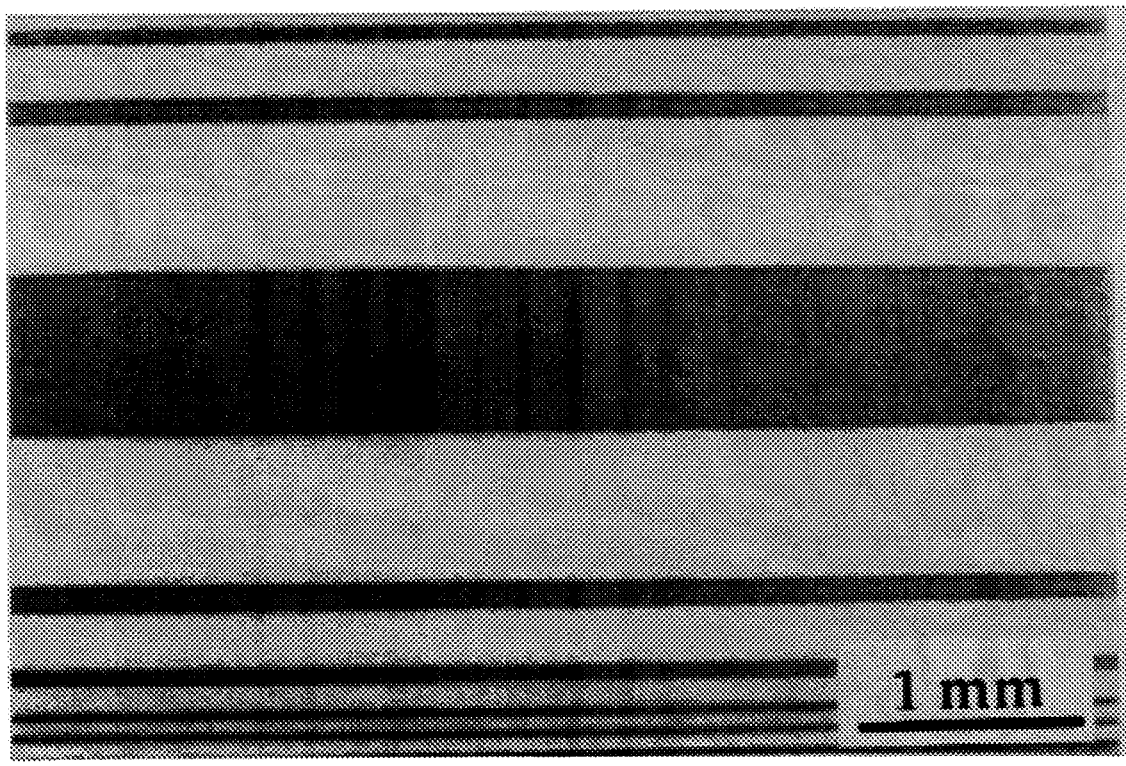
FIG. 11 is a photomicrograph of a longitudinal cross-section of a filament which was axially extruded in a manner of the present invention which demonstrates its "tree ring" structure.
Figure 12:
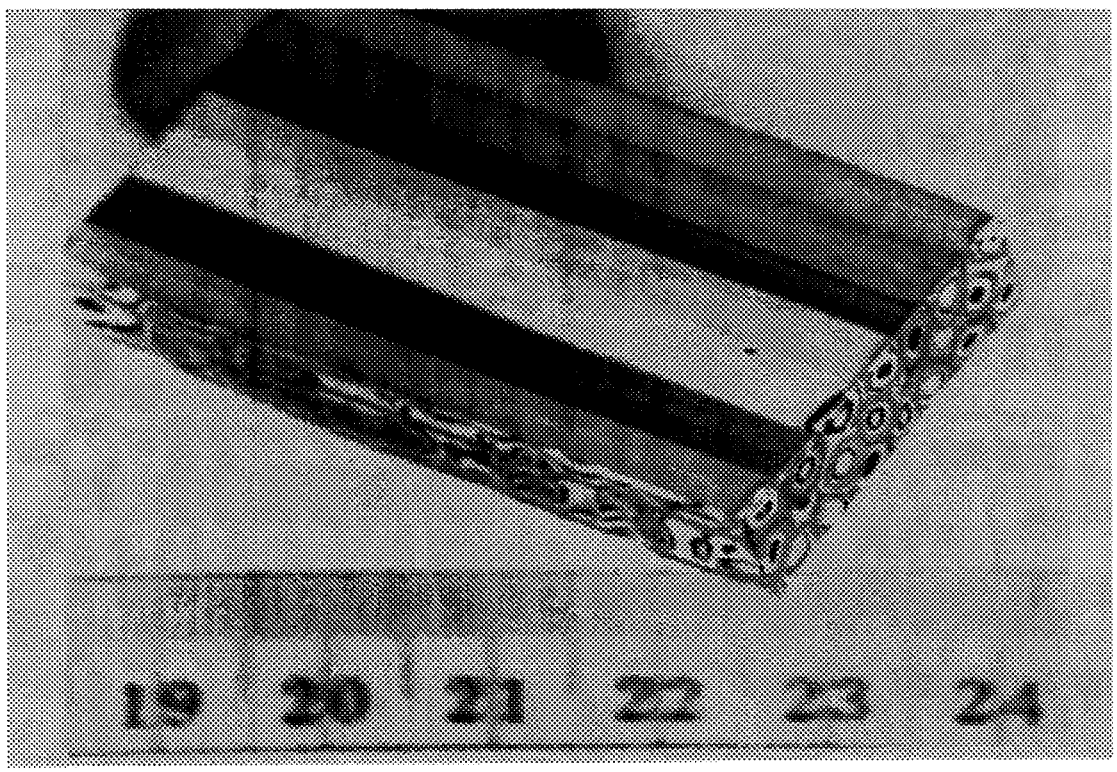
FIG. 12 is a photograph of a green fibrous monolith prepared in a manner of the present invention by molding green ceramic filaments having a "tree ring" structure.

1. Alumina compound:
   A. Sinterable alumina powder: 44.43 g
   B. Ethylene Vinyl Acetate copolymer: 7.57 g
   C. Methoxypolyethylene Glycol [MW 550]: 0.42 g
2. Iron oxide compound:
   A. Iron oxide (hematite) powder: 57.64 g
   B. Ethylene Vinyl Acetate copolymer: 10.23 g
   C. Methoxypolyethylene Glycol [MW 550]: 0.5 g The aluminum oxide compound and the iron oxide compound were compounded as in previous examples. Using the method of Example 6, flat sheets, 0.5 mm thick, were pressed from the alumina and iron compounds. Using a punch, 22 mm diameter discs were cut from these sheets. A feedrod was prepared by stacking these discs in a particular sequence, which was for this example, three white aluminum oxide discs, one red iron oxide disc, etc. After compression molding that stack at a temperature of 160° C. and a load of 10,000N, solid feed rod with axial compositional variations was obtained. This feed rod was extruded at 180° C. through a 2.3 mm orifice to obtain a green fiber with a texture similar to tree rings. An example of this fiber is shown in FIG. 10 (axial section) and FIG. 11 (radial section). A uniaxial layup of these fibers was molded to produce a textured green ceramic article having a wood-like appearance, as illustrated in FIG. 12.

EXAMPLE 9

This example illustrates the preparation of silicon nitride/ boron nitride fibers using "chip and washer" axial extrusion, in accordance with one aspect of the present invention.

1. Silicon nitride compound:
   A. Sinterable silicon nitride powder mixed with sintering aids (9 wt % yttria powder and 3 wt % alumina powder): 36.50 g
   B. Ethylene Vinyl Acetate copolymer: 9.30 g
   C. Heavy Mineral oil: 2.16 g
   D. Methoxypolyethylene Glycol [MW 550]: 1.0 g
2. Boron nitride compound:
   A. Boron nitride powder: 24.75 g
   B. Ethylene Vinyl Acetate copolymer: 10.34 g
   C. Methoxypolyethylene Glycol [MW 550]: 0.75 g The silicon nitride compound and the boron nitride compound were compounded as in previous examples. Using the method of Example 2, the silicon nitride compound and boron nitride compound were compression molded at 150° C. between flat steel sheets to provide flat sheets of each material of 0.3 mm in thickness. Using a punch, 22 mm diameter discs were cut from the silicon nitride sheets. "Washers" were cut from the boron nitride sheets, the washers having a 22 mm outer diameter and a 6 mm inner diameter. A 6 mm silicon nitride disc was then placed into the central hole of the boron nitride disc. A feedrod was prepared by stacking those multi-component discs in a particular sequence, which was for this example four grey silicon nitride discs, one white boron nitride disc, etc.

After compression molding at 150° C. and a load of 23.2N, a solid feed rod with axial compositional variations was obtained. This feed rod was extruded at 110° C. through a 3 mm orifice to obtain a green fiber having a texture similar to tree rings. A uniaxial layup of these fibers was molded to produce a textured green ceramic. After molding a number of such fibers into a desired shape to provide a green fibrous monolithic ceramic, the monolith was baked to remove the binder. The resulting article was then pressure sintered to provide a fibrous monolith having a wood-like appearance.

While the examples included herein utilize piston extrusion, it is believed that other extrusion methods known in the art could also be used. As one example, continuous bicomponent extrusion of highly loaded ceramic systems could be accomplished if properly designed bicomponent spinning dies were utilized.

All of the references cited herein are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

We claim as our invention:

1. A method for preparing a green fibrous monolith comprising extruding at least a first feed rod to provide a green ceramic fiber, the first feed rod being prepared by forming a first ceramic-laden composition comprising a thermoplastic polymer and at least about 40 vol. % of a ceramic particulate into a substantially cylindrical core and applying a second ceramic-laden composition comprising a thermoplastic polymer and at least about 40 vol. % of a ceramic particulate which differs from the first ceramic-laden composition onto the core, and forming a green ceramic monolith by shaping at least the green ceramic fiber, wherein during the extrusion step, each ceramic-laden composition has a viscosity that is approximately equivalent to that of each other ceramic-laden composition.

2. The method according to claim 1, wherein the green ceramic fiber is provided by substantially simultaneously extruding the first feed rod and a second feed rod, wherein the second feed rod is prepared by forming a third ceramic-laden composition comprising a thermoplastic polymer and at least about 40 vol. % of a ceramic particulate into a substantially cylindrical core and applying a layer of a fourth ceramic-laden composition comprising a thermoplastic polymer and at least about 40 vol. % of a ceramic particulate which differs from the particulate contained in the third composition onto the core, and wherein the third ceramic-laden composition is different from the first ceramic-laden composition.

3. The method according to claim 2, wherein the third ceramic-laden composition is different from the first and second ceramic-laden compositions.

4. The method according to claim 3, wherein the fourth ceramic-laden composition is different from the first and second ceramic-laden compositions.

5. The method according to claim 1, further comprising preparing the first feed rod by applying a layer of a third ceramic-laden composition comprising a thermoplastic polymer and at least about 40 vol. % of a ceramic particulate onto the second ceramic-laden composition, wherein the composition of the third ceramic-laden composition differs from the composition of the second ceramic-laden composition.

6. A method for preparing a green fibrous monolith from at least one green ceramic fiber having a controlled texture comprising (a) forming a first ceramic-laden composition comprising a thermoplastic polymer and at least about 40 vol. % of a ceramic particulate into a substantially cylindrical core, (b) applying a layer of a second ceramic-laden composition comprising a thermoplastic polymer and at least about 40 vol. % of a ceramic particulate which differs from the particulate contained in the first composition onto the core to form a substantially cylindrical feed rod having an average diameter, (c) extruding the feed rod to provide at least one green ceramic fiber which has an average diameter that is less than the average diameter of the feed rod, and (d) shaping the at least one green ceramic fiber to provide the green fibrous monolith, wherein, during the extrusion step, each ceramic-laden composition has a viscosity which is approximately equivalent to that of each other ceramic-laden composition, and, when the ceramics present in the extruded at least one green ceramic fiber are sintered, a plane of weakness defined by the interface of the core and the layer is provided, the interface being relatively weaker than the core.

7. The method according to claim 6, wherein when at least two green ceramic fibers are used to provide the green fibrous monolith, one of the fibers having a composition that is different from at least one of the other fibers.

8. The method according to claim 6, the method further comprising heating the green fibrous monolith to sinter the ceramic particles therein, thereby providing a fibrous monolith.

9. The method according to claim 6, further comprising forming a third ceramic-laden composition comprising a thermoplastic polymer and at least about 40 vol. % of a ceramic particulate into a substantially cylindrical core, applying a layer of a fourth ceramic-laden composition comprising a thermoplastic polymer and at least about 40 vol. % of a ceramic particulate which differs from the particulate contained in the third composition onto the core to form a second substantially cylindrical feed rod having an average diameter, extruding the second feed rod to form a second green ceramic fiber which has an average diameter that is less than the average diameter of the second feed rod, and shaping at least the second green ceramic fiber and the first green ceramic fiber to provide the green ceramic monolith, wherein the third ceramic-laden composition is different from the first ceramic-laden composition.

10. The method according to claim 9, wherein the third ceramic-laden composition is different from the first and second ceramic-laden compositions.

11. The method according to claim 10, wherein the fourth ceramic-laden composition is different from the first and second ceramic-laden compositions.

12. The method according to claim 6, wherein before the first green fiber is used in step (d) to provide the green fibrous monolith, the average diameter possessed by the first green ceramic fiber after step (c) is further reduced by extruding the green ceramic fiber.

13. A method for preparing a green fibrous monolith from at least one green multifilament ceramic fiber having a controlled texture comprising (a) forming a first ceramic-laden composition comprising a thermoplastic polymer and at least about 40 vol. % of a ceramic particulate into a substantially cylindrical core, (b) applying a layer of a second ceramic-laden composition comprising a thermoplastic polymer and at least about 40 vol. % of a ceramic particulate which differs from the particulate contained in the first composition onto the core to form a substantially cylindrical feed rod having an average diameter, (c) extruding the feed rod to provide at least two green ceramic fibers, each fiber having an average diameter that is less than the average diameter of the feed rod, (d) extruding the at least two green ceramic fibers substantially simultaneously to form at least one multifilament green ceramic fiber, and (e) shaping the at least one multifilament green ceramic fiber to provide the green fibrous monolith, wherein, during each extrusion step, each ceramic-laden composition has a viscosity which is approximately equivalent to that of each other ceramic-laden composition, and, when the ceramics present in the at least one green ceramic fiber are sintered, a plane of weakness defined by the interface of the core and the layer is provided, the interface being relatively weaker than the cores.

14. The method according to claim 13, the method further comprising heating the green fibrous monolith to sinter the ceramic particles therein, thereby providing a fibrous monolith.

* * * * *